Jan. 26, 1960 J. C. BUDDE 2,922,616
VALVE CONSTRUCTION
Filed Aug. 31. 1956 2 Sheets-Sheet 1
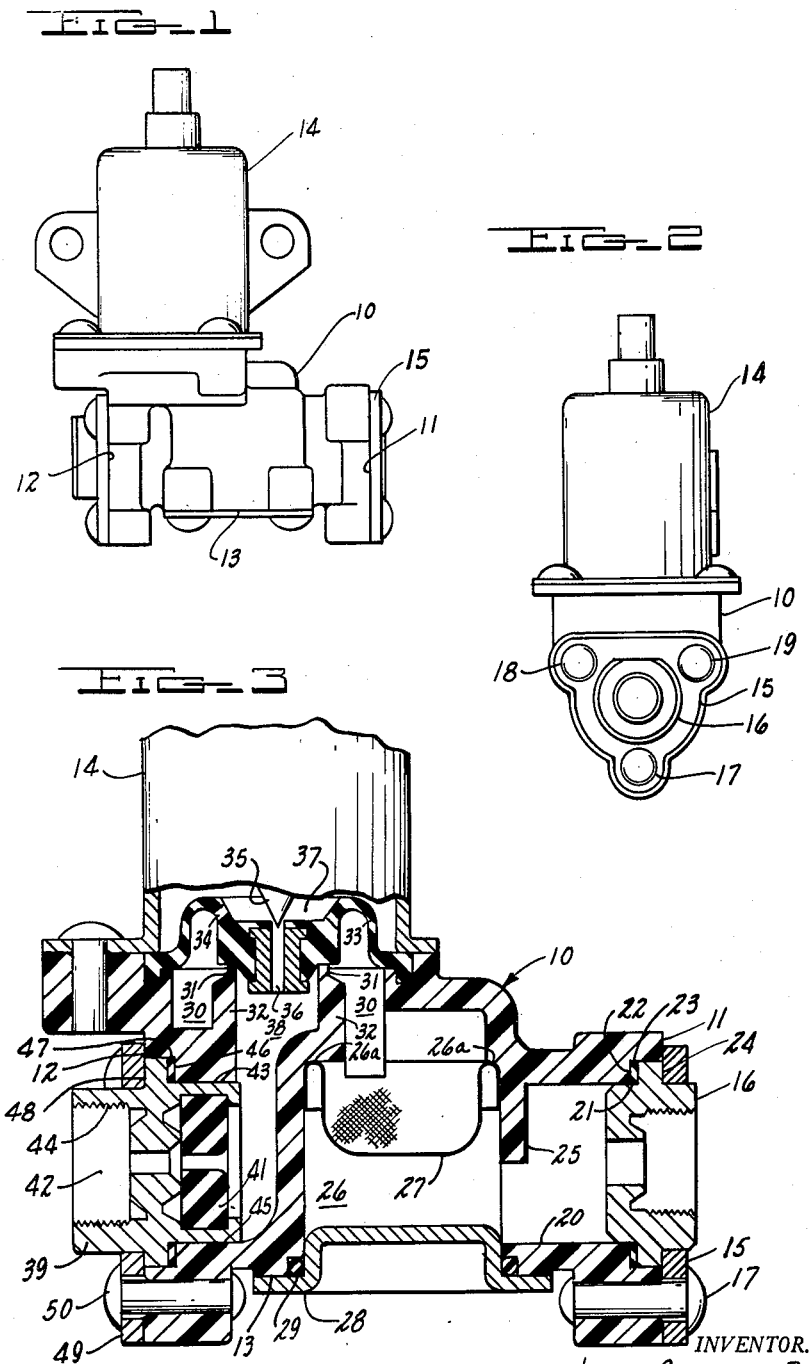
INVENTOR.
JAMES CLARENCE BUDDE
BY
SMITH, OLSEN, LEWIS & McRAE
ATTORNEYS Jan. 26, 1960  J. C. BUDDE  2,922,616
VALVE CONSTRUCTION
Filed Aug. 31, 1956  2 Sheets-Sheet 2
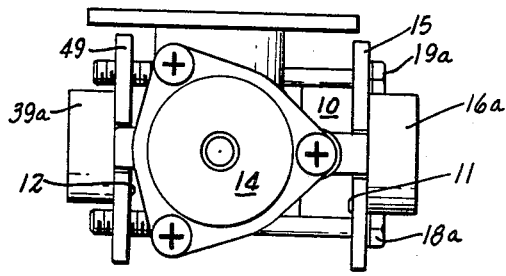
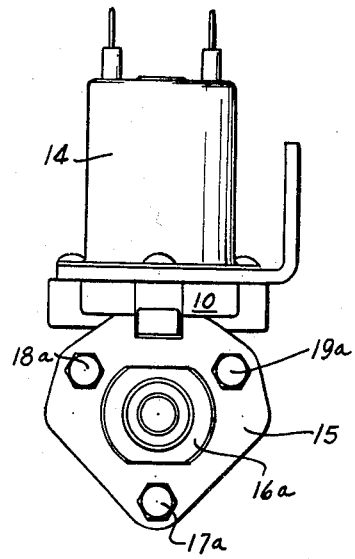
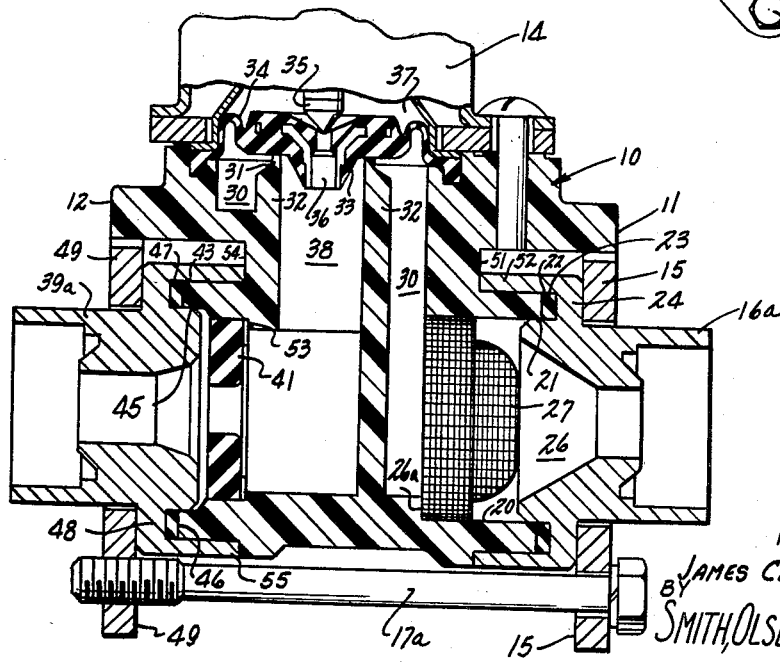
INVENTOR
JAMES CLARENCE BUDDE
BY
SMITH, OLSEN, LEWIS & McRAE
ATTORNEYS

United States Patent Office 2,922,616
Patented Jan. 26, 1960

2,922,616

VALVE CONSTRUCTION

James Clarence Budde, Detroit, Mich., assignor, by mesne assignments, to American Radiator & Standard Sanitary Corporation, New York, N.Y., a corporation of Delaware Application August 31, 1956, Serial No. 607,387

5 Claims. (Cl. 251—148)

This invention relates to improvements in connection with thermoplastic resin valve bodies. More particularly this invention provides a novel plastic valve structure which is especially suitable for being joined with metallic piping or couplings.

Because of their light weight, high corrosion resistance, ease of molding and favorable economic prices, thermoplastic valve bodies have become of great commercial interest, especially for use in such appliances as dishwashers, clothes washers and the like. However, certain spacial problems have arisen in connection with these valves. For instance, due to the drawing qualities of thermoplastic resins such as nylon, if one were to screw a metallic male coupling into a plastic female coupling in the valve body, a leaking joint might result. As the joint becomes tight, the plastic begins to deform and expands so that a good fluid tight joint has been difficult to obtain therefrom. Further, in many cases this expansion has caused internal stresses in the plastic valve body which resulted in internal cracks and distorted shapes. Because it is necessary to have small, compact valve structures, readily adaptable to spacial limitations where installed, it is desirable to have a thermoplastic female coupling structure which will receive coupling units, special outlet valves, piping and the like, and which are not subject to the shortcomings set forth above.

Therefore, it is an object of this invention to provide in a thermoplastic resinous valve body a female coupling means for joining the valve to the connecting piping, coupling units, flow control valves and the like in a fluid tight manner. It is a further object to provide a resinous thermoplastic valve body that is compact in outside shape so as to fit into the spacial limitations of a particular design machine, and also internally designed so that the valve is efficient in operation and relatively easy to fabricate or mold.

Other objects of this invention will appear in the following description and appended claims, reference being had to the accompanying drawings forming a part of this specification wherein like reference characters designate corresponding parts in the several views.

In the drawings:

Fig. 1 shows a side view of the assembled valve of this invention;

Fig. 2 shows a right end view of the valve assembly of Fig. 1;

Fig. 3 is an enlarged, partially cutaway view of the valve assembly shown in Fig. 1 (and is especially drawn to show the novel improvement of this invention);

Fig. 4 shows a top view of a modified assembled valve of this invention;

Fig. 5 shows a right end view of the modified valve assembly of Fig. 4; and

Fig. 6 is an enlarged, partially cutaway view of the modified valve assembly shown in Fig. 4.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the drawings, in Fig. 1 the valve assembly comprises a thermoplastic resinous valve body 10 having an inlet end 11, an outlet end 12, a port 13 for receiving a strainer as will be described hereafter, and attached to the valve body 10 is a solenoid 14 for operating the valve assembly.

In Fig. 2 the right end view of the valve assembly is shown. The solenoid 14 is fastened to the thermoplastic valve body 10. A triangular-shaped retainer ring 15 is shown securing the inlet coupling 16 to the thermoplastic valve body 10 by means of three bolts or rivets or screws shown as 17, 18 and 19.

In the partially cutaway view of Fig. 3, the thermoplastic valve body 10 is shown having an inlet end 11 which has a smooth walled central columnar aperture or opening 20 of predetermined cross sectional shape, which in this case is circular. Fitting into the opening 20 is the male metal fluid-conducting element or inlet coupling unit 16; its male surface 21 being of the same predetermined cross sectional shape as that of the inlet opening 20. About the outer periphery of the opening 20 is an indented shoulder 22, adapted to receive sealing means, shown as a gasket 23, to form a fluid tight union between the thermoplastic valve body 10 and the flange 24 of the metal coupler 16. The coupling unit 16 is secured to the thermoplastic valve body 10 by means of the retainer ring 15 being affixed to the plastic valve body 10, shown by a rivet 17.

As the fluid comes into the inlet of the plastic valve body 10, it flows past a channeling wall 25 into a screening chamber 26 having seating means 26a adapted to receive a screen or strainer 27 which can be replaced periodically by removing the chamber cover 28 and sealing means shown by the gasket 29 from the chamber port 13.

After passing downstream through the screen 27, the fluid then enters chamber 30 defined by the inside of the outer wall of the thermoplastic valve body 10 and the upwardly facing seat portion 31 of the pipe-like member 32 adapted to receive an adjustable or movable diaphragm for the control of fluid through the valve. The mechanism for controlling the passage of fluid through chamber 30 is made automatic by means of a solenoid operated diaphragm type valve 33. This is of a flexible material attached to the outward wall of the thermoplastic valve body 10 and extends over the seat 31. A small opening 34 is provided in the diaphragm so that when the solenoid plunger 35 covers the small central opening 36 in the diaphragm 33, the pressure within the solenoid chamber 37 is made substantially equal to the pressure within the chamber 30. When the solenoid plunger 35 is released from pressing the diaphragm 33 against the seat 31, the fluid in chamber 30 is permitted to flow through the central opening 36 from chamber 37 into cavity 38 and as the central part of the diaphragm 33 is raised off its seat 31, fluid is allowed to pass from chamber 30 across the seat 31 into cavity 38 and from there exits through the flow control annulus device 39 positioned in the valve outlet 12. This flow control annulus 41 is often desirable to control the magnitude of the fluid flow through the exit line cavity shown as 42. By reason of its flexure in correspondence with the pressure difference between chambers 38 and 42, the net area across the annulus available for passage of fluid therebetween is altered. This variation of area with pressure maintains the flow between the chamber substantially constant, even though the pressure difference between chambers 38 and 42 varies.

As with the valve inlet 11, the valve outlet 12 has a smooth-walled central columnar aperture or opening 43 of predetermined cross sectional shape, which in this case is circular. Fitting into the outlet opening 43 is the male metal flow control annulus device 39 which has the flow control annulus 41 contained in its inlet end and a female threaded coupling 44 at the outlet end which partially defines chamber 42. The male surface 45 of the flow control annulus device 39 is of the same predetermined cross sectional shape as that of the outlet opening 43. About the outer periphery of the outlet opening 43 is an indented shoulder 46, adapted to receive sealing means, shown as a gasket 47, to form a fluid tight union between the thermoplastic valve body 10 and the flange 48 of the metal flow control annulus device 39. The metal flow control annulus device 39 is secured to the thermoplastic valve body 10 by means of a retainer ring 49 being affixed to the plastic body 10 as shown by rivet 50.

The valve body 10 shown in Fig. 3 has its inlet 11 axially aligned with its outlet 12. It is a preferred embodiment of this invention, but not shown in Fig. 1, 2 or 3, where the inlet and outlet of the thermoplastic valve are in axial alignment, to attach the fluid conducting elements or couplers to the resinous apparatus and to each other by means of at least one tie rod. For instance, in Fig. 3, by a slight modification in valve body designs, a single tie rod could be used to take the place of the two rivets 17 and 50 and thereby help to detachably affix the metal couplings 16 and 39 to the resinous valve body 10 and to each other.

Where convenient, more than one tie rod can be used. Such an embodiment is shown in Figs. 4, 5 and 6. Viewing the valve from the top of the solenoid 14 in Fig. 4, the inlet coupling 16a retained in the inlet end 11 by a somewhat triangular-shaped retainer ring 15, and outlet coupling 39a retained in the outlet 12 by a somewhat triangular-shaped ring 49 are axially aligned and bolted together by three tie bolts through the two retainer rings 15 and 49, only two bolts or tie rods of which are shown as numerals 18a and 19a. The near triangle shape of the retaining ring and the placement of the tie rod bolts or screws 17a, 18a and 19a can be best seen in Fig. 5, which is an inlet end view of the assembled valve.

In Fig. 6, where the tie rod 17a is shown holding the axially aligned inlet coupling 16a and the outlet coupling 39a against the valve body 10 by means of the retainer rings 15 and 49 respectively, a partially cutaway interior view of the valve modification is also shown. The valve body 10 is shown having an inlet 11 which has a smooth-walled central columnar aperture or opening 20 of predetermined cross sectional shape, which in this case is circular. Fitting into the opening 20 is the male fluid conducting element or inlet coupling unit 16a, its male surface 21 being of the same predetermined cross sectional shape as that of the inlet opening 20. About the outer periphery of the opening 20 is a shoulder 22 adapted to receive sealing means, shown as gasket 23, to form a fluid tight union between the thermoplastic valve body 10 and the flange 24 of the coupler 16. In this modification the valve body has an indented portion 51 near the periphery of the opening 20 which is adapted to receive a raised lip portion 52 on the flange 24 of the coupler 16a.

As the fluid comes into the inlet of the plastic valve body 10, it flows into a screening chamber 26 having sealing means 26a adapted to receive a screen or strainer 27 which can be replaced periodically by removing the inlet coupler 16a.

After passing downstream through the screen 27, the fluid then enters chamber 30 defined by the inside of the outer wall of the thermoplastic valve body 10 and the upwardly facing seat portion 31 of the pipe-like member 32 adapted to receive an adjustable or movable diaphragm for the control of fluid through the valve. As in the embodiment of Figs. 1, 2 and 3, the mechanism for controlling the passage of fluid through the chamber 30 is made automatic by means of the solenoid operated, diaphragm type valve 33.

When the valve 33 is open, fluid flows into cavity 38 and from there exits through the flow control annulus 41 positioned on a raised shoulder 53 within the smooth walled central columnar aperture or opening 43 in outlet 12, and out through the coupler 39a whose male surface 45 fits into the outlet opening 43. The female surface of opening 43 and the male surface 45 of the coupler 39a are of the same predetermined cross sectional shapes. About the outer periphery of the outlet opening 43 is a shoulder 46 adapted to receive sealing means, shown as gasket 47, to form a fluid tight union between the thermoplastic valve body 10 and the flange 48 of the coupler 39a. As with the inlet, the outlet of the valve body has an indented portion 54 near the periphery of the opening 43 which is adapted to receive the raised lip portion 55 on the flange 48 of the coupler 39a.

Although this invention has been described as being particularly applicable in joining male metal fixtures to a female thermoplastic apparatus used in handling fluids, it is not to be limited thereto for a male non-metallic fixture such as a resinous thermoplastic coupling also may be used, and this may be especially useful where the fluid handled is corrosive to metals but relatively noncorrosive to the particular thermoplastic resinous material of construction used.

Further, although this invention has been described with respect to the commercial polymeric material known as "nylon" as a preferred thermoplastic resinous material, it is not to be limited thereto, for any such suitable thermoplastic resinous material, such as the many polyesters, the polyethylenic type polymers and the like, also may be adaptable to this invention.

Having thus described the invention, what is claimed is:

1. The combination comprising a thermoplastic valve body having a flow opening in one of its faces; an annular deformable gasket positioned on said face concentric with the opening; a tubular metal coupling element having an inner smooth surfaced section positioned in the opening, an annular flange positioned on the gasket, and an outer threaded section for attachment with external piping; an annular clamping plate surrounding the threaded section and pressuringly positioned on the annular flange to hold the coupling element on the valve body; one of said clamping plates and coupling elements abutting against a portion of the valve body to limit the pressure on the gasket.

2. The combination comprising a thermoplastic valve body having a flow opening in one of its faces; an annular recess in said one face surrounding said opening; an annular deformable gasket positioned in said recess; a tubular metal coupling element having an inner smooth surfaced section positioned in the opening, an annular flange positioned on the gasket, and an outer threaded section for attachment with external piping; an annular clamping plate surrounding the threaded section and engaging both the annular flange and said one valve body face, whereby to limit the pressure on the gasket.

3. The combination comprising a thermoplastic valve body having an integral tubular projection forming a flow passage, an annular flat face, an external surface concentric with the flow passage, and a shoulder at the juncture of the external surface with the main portion of the valve body; an annular deformable gasket positioned on said flat face; a metal coupling element having an inner smooth surfaced section positioned within the flow passage, an annular flange positioned on the gasket, an annular wall extending axially from the flange along the aforementioned external surface into abutment with the aforementioned shoulder, and a threaded section for attachment with external piping; and an annular clamping plate pressuringly positioned on the annular flange to hold the coupling element on the valve body.

4. The combination comprising a thermoplastic valve body having a pair of axially aligned projections; each of said projections forming a flow passage, an annular flat face, an external surface concentric with the flow passage, and a shoulder at the juncture of the external surface with the main portion of the valve body; an annular deformable gasket positioned on the flat face of each projection; a metal coupling element positioned on each of the projections; each coupling element having an inner smooth surfaced section positioned within the flow passage, an annular flange positioned on the gasket, an annular wall extending axially from the flange along the aforementioned external surface into abutment with the aforementioned shoulder, and a threaded section for attachment with external piping; an annular clamping plate positioned on the annular flange of each coupling element; and tie bolts interconnecting the clamping plates to hold them in pressure engagement with the coupling elements.

5. The combination comprising a thermoplastic valve body having a flow opening in one of its faces; an annular deformable gasket positioned on said face concentric with the opening; a tubular metal coupling element having an annular flange positioned on the gasket, and an outer threaded section for attachment with external piping; an annular clamping plate surrounding the threaded section and pressuringly positioned on the annular flange to hold the coupling element on the valve body; one of said clamping plate and coupling element abutting against a portion of the valve body to limit the pressure on the gasket.

References Cited in the file of this patent

UNITED STATES PATENTS

| Re. 24,255 | Lund | Dec. 11, 1956 |
| 343,451 | Habernicht | June 8, 1886 |
| 2,289,164 | Arnold | July 7, 1942 |
| 2,295,774 | Corydon | Sept. 15, 1942 |
| 2,461,414 | Donner | Feb. 8, 1947 |
| 2,735,699 | Chadbourne | Feb. 21, 1956 |

FOREIGN PATENTS

| 743,704 | France | Sept. 19, 1932 |